(12) United States Patent
Nishida

(10) Patent No.: US 8,393,152 B2
(45) Date of Patent: Mar. 12, 2013

(54) ELECTRIC SUPERCHARGER

(75) Inventor: Hideyuki Nishida, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 894 days.

(21) Appl. No.: 12/310,110

(22) PCT Filed: Aug. 20, 2007

(86) PCT No.: PCT/IB2007/002370
§ 371 (c)(1),
(2), (4) Date: Feb. 11, 2009

(87) PCT Pub. No.: WO2008/029211
PCT Pub. Date: Mar. 13, 2008

(65) Prior Publication Data
US 2009/0194044 A1    Aug. 6, 2009

(30) Foreign Application Priority Data

Sep. 6, 2006   (JP) .................................. 2006-241548

(51) Int. Cl.
*F02B 37/10*   (2006.01)
(52) U.S. Cl. ........ 60/607; 60/608; 60/605.3; 417/423.13
(58) Field of Classification Search ............ 60/607–608, 60/605.3; 417/423.13; 290/52; 310/52–64
See application file for complete search history.

(56) References Cited

U.S. PATENT DOCUMENTS

| 3,277,658 A | * | 10/1966 | Leonard, Jr. ...................... 62/87 |
| 3,927,530 A | * | 12/1975 | Braun .............................. 60/607 |
| 5,605,045 A | * | 2/1997 | Halimi et al. .................... 60/607 |
| 8,006,495 B2 | * | 8/2011 | Igarashi et al. .................. 60/608 |
| 2004/0237522 A1 | | 12/2004 | Squires |
| 2006/0248887 A1 | | 11/2006 | Arnold |

FOREIGN PATENT DOCUMENTS

| DE | 10 2004 050 135 A1 | 5/2005 |
| DE | 696 36 906 T2 | 6/2007 |
| EP | 1 348 848 A2 | 10/2003 |
| JP | A-60-60219 | 4/1985 |
| JP | A-1-155028 | 6/1989 |
| JP | A-2003-102147 | 4/2003 |
| JP | A-2005-90403 | 4/2005 |
| WO | WO 03/025364 A1 | 3/2003 |

OTHER PUBLICATIONS

Office Action for corresponding German Patent Application No. 112007 001 954.9-13, dated Mar. 14, 2011 (w/English translation).

\* cited by examiner

*Primary Examiner* — Tran Nguyen
*Assistant Examiner* — Leda Pham
(74) *Attorney, Agent, or Firm* — Oliff & Berridge, PLC

(57) ABSTRACT

An lubricating oil from an oil pump that is driven by rotation of an engine is supplied as a refrigerant to a rotor of an assist motor via a pressure valve. The pressure valve is configured to be closed when the pressure of the lubricating oil is less than a predetermined value, and to open when the pressure of the lubricating oil is greater than or equal to the predetermined value. As a result, when the rotor is in low need for cooling down because the temperature rise of the rotor is small although the rotation speed of the rotor rises, that is, when the engine is operating at a low rotation speed with a high load, the supply of lubricating oil to the rotor is reduced or stopped.

14 Claims, 6 Drawing Sheets

ELECTRIC SUPERCHARGER

BACKGROUND OF THE INVENTION

1. Field of the Invention

The invention relates to an electric supercharger and more particularly, relates to an electric supercharger in which an electric motor (rotating electrical machine) that rotates the supercharger is cooled.

2. Description of the Related Art

A supercharger that compresses air to be supplied into an engine by rotation of a compressor wheel and supplies the compressed air to the engine in order to improve the output of the engine, is known. Also, an electric supercharger equipped with a rotating electrical machine that applies torque to the compressor wheel, is known. For example, Japanese Patent Application Publication No. 2005-90403 (hereinafter referred to as "JP-A-2005-90403") discloses a lubrication control device of an electric supercharger.

The lubrication control device of the electric motor-equipped supercharger disclosed in JP-A-2005-90403 lubricates and cools a rotating shaft of a turbine and compressor by using lubricating oil that is circulated in a turbo unit. The lubrication control device sets the amount of lubricating oil with the drive rotation speed of a motor that is provided in the supercharger. As a result, oil may be prevented from running out of and a reliable lubrication may be realized by increasing the amount of lubricating oil when the motor provided in the supercharger rotates at a high speed. Also, the turbo unit may be cooled sufficiently because a larger amount of heat is carried away from the turbo unit. On the other hand, when the motor provided in the supercharger rotates at a low speed, an increase in rotational resistance due to viscosity of the lubricating oil may be restrained by reducing the amount of lubricating oil within a necessary range that amounts of lubrication and cooling are secured.

Incidentally, Japanese Patent Application Publication No. 2003-102147 (hereinafter referred to as "JP-A-2003-102147") discloses a cooling device for a general motor that is provided with a stator-side cooling passage that cools the stator of the motor and a rotor-side cooling passage that cools the rotor. The cooling device further includes distribution means that distributes a cooling liquid (refrigerant) between the stator-side cooling passage and the rotor-side cooling passage in accordance with an arbitrary flow ratio. The distribution means changes the flow ratio between the stator-side cooling passage and the rotor-side cooling passage according to the rotor rotation speed. As a result, a cooling efficiency of the cooling device may be improved taking into account the fact that the heat generation characteristics of the rotor and the stator change according to the rotation speed.

However, the temperature rise characteristics of the rotor of the motor provided in the electric supercharger is not determined only by the rotor rotation speed, but is also greatly affected by the temperature of exhaust gas that rotates a turbine wheel connected to the motor. For example, when the engine is operated at a low rotation speed with high load, the rotor temperature of the motor does not rise very high because the temperature of exhaust gas from the engine is low although the rotor rotation speed rises.

According to the disclosures of JP-A-2005-90403 and JP-A-2003-102147, the supply amount of the refrigerant (lubricating oil) is controlled only focusing on the rotation speed (rotor rotation speed) of the motor provided on the supercharger. Therefore, the motor is incapable of cooling down efficiently because a large amount of lubricating oil is supplied to the motor even when the rotor is in low need for cooling down, for example, even when the engine is operating at a low rotation speed with high load. As a result, an energy consumption of the lubricating oil supply mechanism such as the oil pump, unnecessarily increases, and the fuel economy of the vehicle becomes worse. Furthermore, if lubricating oil is excessively supplied to the motor, the rotational resistance of the rotor is unnecessarily increased. From this standpoint, the fuel economy of the vehicle also becomes worse.

SUMMARY OF THE INVENTION

The invention provides an electric supercharger equipped with an electric motor that rotates the supercharger (hereinafter, simply referred to as "assist motor") to improve the fuel economy of a vehicle by cooling the assist motor with increased efficiency.

One aspect of the invention relates to an electric supercharger including a supercharger that compresses an intake air of an internal combustion engine by rotating the supercharger using an exhaust gas of the internal combustion engine; a rotating electrical machine that has a rotor which is linked to a rotating shaft of the supercharger; and a refrigerant supply device that supplies a refrigerant to the rotating electrical machine. The refrigerant supply device includes cooling control means that controls a refrigerant supply amount supplied to the rotating electrical machine according to a rotation speed of the internal combustion engine. The cooling control means may increase the refrigerant supply amount that is supplied to the rotating electrical machine as the rotation speed of the internal combustion engine increases.

According to the aspect of the invention, when the rotor rotation speed of the rotating electrical machine (i.e., assist motor) becomes high but the rotor temperature does not rise very high, that is, when the engine is operating at a low rotation speed with high load, unnecessary supply of the refrigerant may be stopped. Therefore, unnecessary energy consumption of the refrigerant supply device may be restrained. Furthermore, unnecessary increase in the rotational resistance of the assist motor may be prevented. As a result, the electric supercharger may be efficiently cooled, and the fuel economy of the vehicle may be improved.

The refrigerant supply device may include a refrigerant supply pump, and a pressure of the refrigerant that is supplied from the refrigerant supply pump may increase as the rotation speed of the internal combustion engine increases. The cooling control means may have a flow rate control valve that is provided on a refrigerant supply passage which extends from the refrigerant supply pump to the rotating electrical machine, and that controls a flow rate of the refrigerant.

The flow rate control valve may be a pressure valve that is mechanically opened as the pressure of the refrigerant supplied from the refrigerant supply pump increases.

Thus, the refrigerant supply device with a simple configuration may be realized by a combination of the refrigerant supply pump (e.g., an oil pump driven by the internal combustion engine) that the discharge pressure increases according to an increase in the rotation speed of the internal combustion engine, and the pressure valve (e.g., a mechanical pressure valve) that is opened as the pressure of the refrigerant supplied from the refrigerant supply pump increases.

Furthermore, the cooling control means may increase the refrigerant supply amount which is supplied to the rotating electrical machine as the rotation speed and a load of the internal combustion engine increase.

Thus, the refrigerant supply amount may be appropriately controlled in accordance with the exhaust gas temperature that depends on the rotation speed and the load of the internal combustion engine, and the assist motor of the electric supercharger may be efficiently cooled.

Furthermore, the cooling control means may also have the flow rate control valve and a control portion that controls opening degree of the flow rate control valve.

The flow rate control valve may be an opening degree adjustment valve whose opening degree is electromagnetically adjusted by the control portion. The control portion may adjust the opening degree of the opening degree adjustment valve in accordance with the rotation speed and the load of the internal combustion engine.

Also, the control portion may adjust the opening degree of the opening degree adjustment valve by calculating an opening degree value of the opening degree adjustment valve based on the rotation speed and the load of the internal combustion engine.

Thus, the refrigerant supply device may be realized by a combination of the refrigerant supply pump (e.g., an oil pump driven by the internal combustion engine) that the discharge pressure increases according to an increase in the rotation speed of the internal combustion engine, and the opening degree adjustment valve (e.g., an electromagnetic opening degree adjustment valve) whose opening degree is controllable.

The refrigerant may be a lubricating oil of the internal combustion engine. The refrigerant supply passage may be divided into a first passage that is formed so as to allow heat exchange between a bearing portion of the rotating shaft of the supercharger and the refrigerant, and a second passage that is formed so as to allow heat exchange between the rotor of the rotating electrical machine and the refrigerant. The pressure valve or the opening degree adjustment valve may be provided on the second passage.

The pressure valve may be opened when the pressure of the refrigerant in the second passage is greater than or equal to a predetermined pressure. Furthermore, the predetermined pressure may be a pressure when the pressure valve starts to open from a closed valve state, and the predetermined pressure may be different from a pressure when the pressure valve starts to be closed from an open valve state.

Thus, when the rotor rotation speed rises but the temperature rise of the rotor is small, that is, when the engine is operating at a low rotation speed with high load, the supply of the lubricating oil (i.e., the refrigerant) to the rotor may be shut off wile reliable lubricating and cooling performance may be secured by supplying the lubricating oil to the bearing portion of output shaft of the supercharger.

The refrigerant supply pump may be an oil pump that is driven by a rotating shaft of the internal combustion engine to output the lubricating oil.

By using the oil pump that is driven by the rotating shaft of the internal combustion engine as the refrigerant supply pump, the refrigerant may be supplied to the electric supercharger using an existing oil pump for supplying an lubricating oil to the engine without providing another refrigerant supply pump for the electric supercharger.

As described above, according to the electric supercharger of the invention, the motor that rotates the supercharger may be more efficiently cooled and the fuel economy of the vehicle may be improved.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
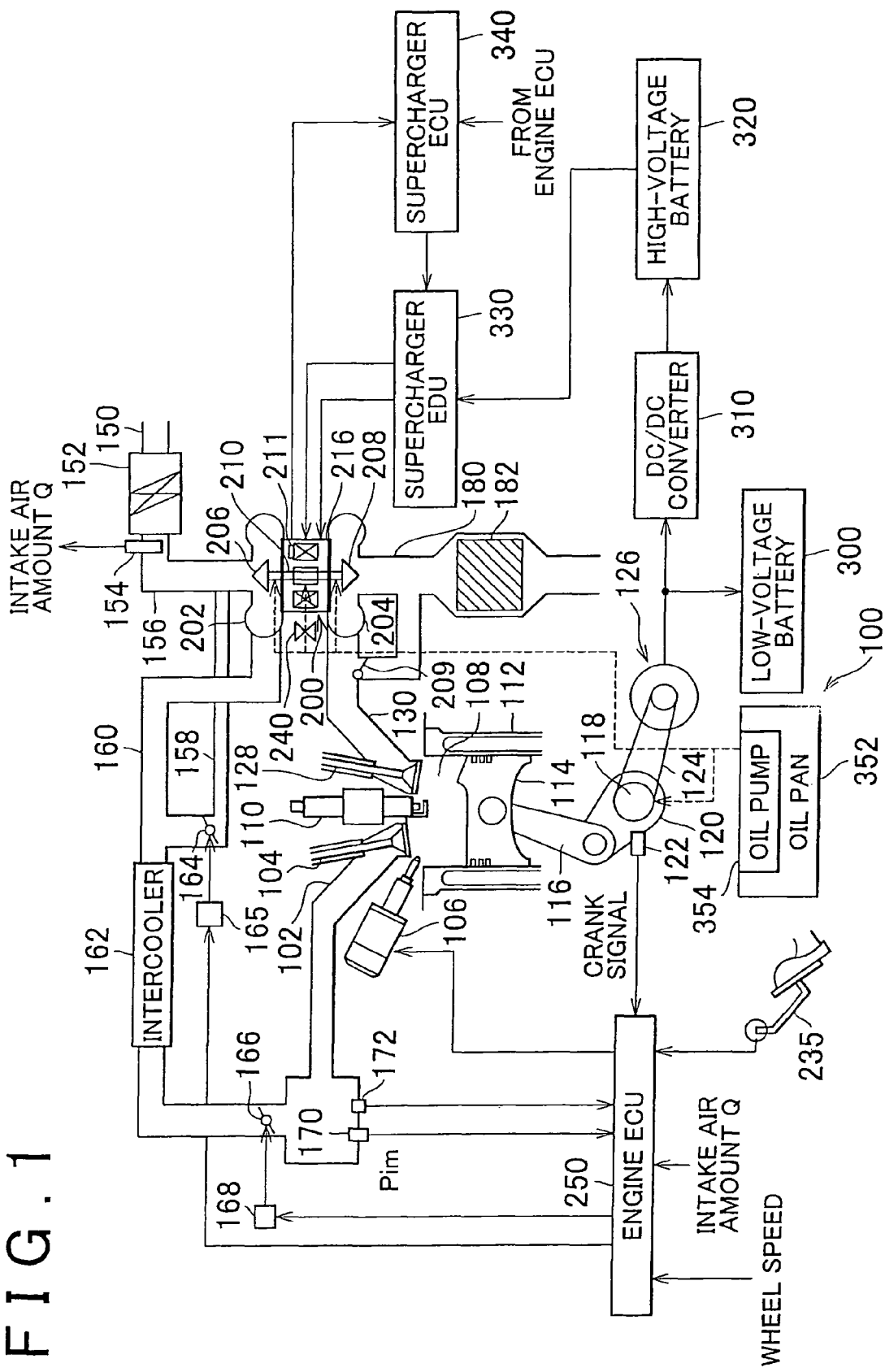
FIG. 1 is a diagram showing a schematic view of an engine system in which an electric supercharger is mounted according to a first example embodiment of the invention.

Hereinafter, example embodiments of the invention will be described in detail with reference to the drawings. Further, the same reference characters in the drawings represent the same or corresponding portions, and the description thereof will not be repeated.

FIG. 1 is a diagram showing a schematic view of an engine system in which an electric supercharger is mounted according to a first example embodiment of the invention.

Referring to FIG. 1, the engine system includes an engine 100, a supercharger 200, an intercooler 162, an engine electronic control unit (hereinafter, simply referred to as "engine ECU") 250, and a supercharger electronic control unit (hereinafter, simply referred to as "supercharger ECU") 340. The engine system according to the first example embodiment is mounted in a vehicle. The engine ECU 250 and the supercharger ECU 340 may be integrated into a single ECU. As shown in FIG. 1, the engine ECU 250 and the supercharger ECU 340 are interconnected for bidirectional communication.

Air that is taken from an intake opening 150 is filtered by an air cleaner 152. The air that was filtered by the air cleaner 152 flows to a supercharger 200 via an intake passage 156. The air that was introduced to the supercharger 200 is compressed by a compressor 202. Then, the compressed air flows through an intake passage 160, and is cooled by the intercooler 162. The air that was cooled by the intercooler 162 flows through an intake passage 102, and is taken into the engine 100.

An intermediate portion of the intake passage 156 is provided with an air flow meter 154 that detects the intake air amount Q. The air flow meter 154 sends a signal representing the detected intake air amount to the engine ECU 250.

The intercooler 162 cools the air whose temperature has been raised in the course of the compression by the compressor 202. The volume of the cooled air becomes smaller than before cooling down, and therefore greater amount of air may be fed into the engine 100.

A bypass passage 158 connecting the intake passage 156 and the intake passage 160 is provided on the intake passage 156. An intermediate portion of the bypass passage 158 is provided with an air bypass valve 164 that adjusts a flow of the air flowing through the bypass passage 158. The air bypass valve 164 is operated by a valve driving portion 165 in accordance with a control signal received from the engine ECU 250.

An intermediate portion of the intake passage 102 is provided with a throttle valve 166 that adjusts a flow of the air flowing through the intake passage 102. The throttle valve 166 is driven by a throttle motor 168 in accordance with a control signal received from the engine ECU 250.

Furthermore, another intermediate portion of the intake passage 102 is provided with an intake pipe pressure sensor 170 and an intake air temperature sensor 172. The intake pipe pressure sensor 170 detects a pressure of the air in the intake passage 102. A signal representing the detected pressure of the air is sent to the engine ECU 250. The intake air temperature sensor 172 detects a temperature of the air in the intake passage 102. A signal representing the detected temperature of the air is sent to the engine ECU 250.

The engine 100 includes a cylinder head (not shown) and a cylinder block 112. The cylinder block 112 has a plurality of cylinders that extend in a perpendicular direction on the sheet of the drawing of FIG. 1. A piston 114 is provided in each cylinder so as to slide up and down in the cylinder block 112. The piston 114 is linked to a crankshaft 120 via a connecting rod 116. The piston 114, the connecting rod 116 and the crankshaft 120 form a crank mechanism.

A combustion chamber 108 is formed above the piston 114. The combustion chamber 108 is provided with an ignition plug 110 and a fuel injection injector 106 that are directed to the combustion chamber 108. The first example embodiment is described on the assumption that the engine 100 is a direct-injection engine, but the engine 100 is not limited to the direct-injection engine. For example, the engine 100 may be an internal combustion engine, and the engine 100 may be a port-injection type engine, a diesel engine, etc.

The cylinder head (not shown) is provided so that an intake passage 102 and an exhaust passage 130 are connected to the combustion chamber 108. An intake valve 104 is provided between the intake passage 102 and the combustion chamber 108. An exhaust valve 128 is provided between the exhaust passage 130 and the combustion chamber 108. The intake valve 104 and the exhaust valve 128 are driven by a camshaft (not shown) that rotates in conjunction with the crankshaft 120.

The air that flows in the intake passage 102 is introduced into the combustion chamber 108 as the piston 114 descends and the intake valve 104 is opened. The air that has flown into the combustion chamber 108 is mixed with fuel injected from the fuel injection injector 106. When the intake valve 104 is closed and the piston 114 ascends to or near the top dead center of the piston 114, the mixture of fuel and air is ignited and burned by the ignition plug 110. The pressure produced by combustion pushes the piston 114 down. At this time, the up-down motion of the piston 114 is converted into the rotational motion of the crankshaft 120 by the crank mechanism. When the piston 114 descends to or near the bottom dead center of the piston 114, the exhaust valve 128 opens. As the piston 114 ascends again, the air having been subjected to the combustion in the combustion chamber 108, that is, exhaust gas flows into the exhaust passage 130. After flowing into the exhaust passage 130, the air drives a turbine 204 of a supercharger 200, and then flows through an exhaust pipe 180 and is thus led to a catalyst 182. After being purified by the catalyst 182, the exhaust gas is let out of the vehicle.

A pulley (not shown) is provided on an end of the crankshaft 120. The pulley is linked via a belt 124 to another pulley that is provided on a rotating shaft of an alternator 126. Due to the rotation of the crankshaft 120, the alternator 126 is operated to generate electric power.

A timing rotor 118 is provided on the crankshaft 120, and rotates together with the crankshaft 120. An outer periphery of the timing rotor 118 has a plurality of protrusions that are spaced by predetermined intervals. A crank position sensor 122 is provided facing the protrusions of the timing rotor 304. As the timing rotor 118 rotates, the air gap between the protrusions of the timing rotor 118 and the crank position sensor 122 changes, and therefore the magnetic flux passing through a coil portion of the crank position sensor 122 increases and decreases generating electromotive force in the coil portion. The crank position sensor 122 sends a signal representing the electromotive force to the engine ECU 250. The engine ECU 250 detects the crank angle on the basis of the signal from the crank position sensor 122.

Furthermore in the vehicle, vehicle speed sensors (not shown) are provided at road wheels, and detect the rotation speeds of the road wheels (road wheel speeds). The vehicle speed sensors send signals representing results of detection to the engine ECU 250. The engine ECU 250 detects the vehicle speed from the rotation speeds of the road wheels.

The engine ECU 250 performs computation processes on the basis of the signals from various sensors which represent the intake air pressure, the intake air temperature, the intake air amount, the road wheel speeds, the amount of depression of an accelerator pedal 235, etc., and maps and programs stored in a memory, and controls appliances and the like so that the engine 100 is in a desired operation state.

The supercharger 200 includes the compressor 202, a shaft 210 and the turbine 204. The shaft 210 may be rotated by an assist motor (rotating electrical machine) 216.

A compressor wheel (also called compressor rotor or compressor blade) 206 is placed in a housing of the compressor 202. The compressor wheel 206 compresses (supercharges) the air that has been filtered by the air cleaner 152.

A turbine wheel (also called turbine rotor or turbine blade) 208 is placed in a housing of the turbine 204. The turbine wheel 208 is rotated by exhaust gas.

The compressor wheel 206 and the turbine wheel 208 are provided on two opposite ends of the shaft 210, respectively. That is, when the turbine wheel 208 is rotated by exhaust gas, the compressor wheel 206 also rotates.

The assist motor 216 that rotates around the shaft 210 is provided between the compressor wheel 206 and the turbine wheel 208. The shaft 210 is rotatably supported by a housing of the assist motor 216.

The assist motor 216 applies torque to the shaft 210 from the electric power that is supplied from a supercharger electronic drive unit (hereinafter, simply referred to as "supercharger EDU") 330 in accordance with the control signal of the supercharger ECU 340. The supercharger EDU 330 uses the electric power supplied from the high-voltage battery 320, and supplies the assist motor 216 with the electric power that corresponds to the control signal input from the supercharger ECU 340. The supercharger EDU 330 may be an inverter, for example.

The assist motor 216 is provided with a rotator position sensor 211. The rotator position sensor 211 detects the rotational position (rotational angle) and the rotation speed of the rotator (rotor). A signal representing the detected rotational position and the detected rotation speed of the rotator is sent to the supercharger ECU 340. The rotator position sensor 211 may be a hall sensor, for example.

A high-voltage battery 320 is electrically connected to a DC/DC converter 310. The DC/DC converter 310 is electrically connected to the aforementioned alternator 126. Therefore, the electric power generated by the alternator 126 is raised to an appropriate voltage by the DC/DC converter 310, and then is supplied to the high-voltage battery 320. Thus, the high-voltage battery 320 is charged. The electric power generated by the alternator 126 is also supplied to a low-voltage battery 300. Thus, the low-voltage battery 300 is charged. The low-voltage battery 300 supplies electric power to the engine ECU 250, the supercharger ECU 340, etc.

The supercharger ECU 340 performs computation processes on the basis of the information sent from the engine ECU 250, the signal sent from the rotator position sensor, and the maps and programs stored in the memory, and controls the appliances and the like so that the supercharger 200 is in a desired operation state.

In the supercharger 200 having a construction as described above, the exhaust gas produced by the combustion of mixture of fuel and air in the engine 100 is led into the turbine 204 via the exhaust passage 130. The exhaust gas then rotates the turbine wheel 208, whose torque is transmitted to the shaft 210. Then, the exhaust gas flows through the exhaust pipe 180, and is led to the catalyst 182. The exhaust gas that has led to the catalyst 182 is purified and is then let out of the vehicle. A wastegate valve 209 is provided so that when the rising of the supercharge pressure is to be curbed, the wastegate valve 209 is operated to bypass a portion of the exhaust gas that is led to the turbine 204.

On the other hand, the air taken in from outside the vehicle in order to be supplied to the engine 100 is filtered by the air cleaner 152, and is led into the compressor 202 through the intake passage 156. The air is compressed (supercharged) by the compressor wheel 206 that rotates integrally with the shaft 210. The compressed air is led to the intercooler 162 and is cooled. The cooled air is introduced into the combustion chamber 108 via the intake passage 102 of the engine 100.

When the air compressed by the compressor 202 does not reach a desired supercharge pressure under a low rotation speed region of the engine 100 (e.g., when the rotation speed of the engine 100 is equal to or less than a predetermined rotation speed), the supercharger ECU 340 performs a control of driving the assist motor 216 so that the supercharge pressure of the compressor 202 rises in a forced fashion.

This engine system further includes an oil pan 352 and an oil pump 354. The oil pump 354 is, for example, a mechanical pump that is driven by the rotating shaft of the engine 100, and discharges lubricating oil stored in the oil pan 352. A discharge pressure of the oil pump 354, that is, the pressure of lubricating oil supplied from the oil pump 354, rises in accordance with increases in the engine rotation speed. As indicated by a dotted line in FIG. 1, the lubricating oil supplied from the oil pump 354 is supplied to the engine 100 and the electric supercharger that includes the assist motor 216. The oil pump 354 may be regarded as a "refrigerant supply pump" in the invention. Here, the oil pump is not limited to discharge the lubricating oil stored in the oil pan.

The lubricating oil from the oil pump 354 does not only lubricate the engine 100 and the assist motor 216, but also cools the engine 100 and the assist motor 216. Through heat exchange between the rotor of the assist motor 216 and the lubricating oil, the rotor is cooled, so that decline of output (i.e., decline of magnetic force) of the assist motor 216 may be restrained. That is, the first example embodiment may employ the engine lubricating oil as a "refrigerant" that cools the electric supercharger.

A flow rate control valve 240 is provided on an intermediate portion of a path where the lubricating oil is supplied from the oil pump 354 to the rotor of the assist motor 216. As described in detail below, a mechanical pressure valve may be arranged as the flow rate control valve 240 in the first example embodiment.

Figure 2:
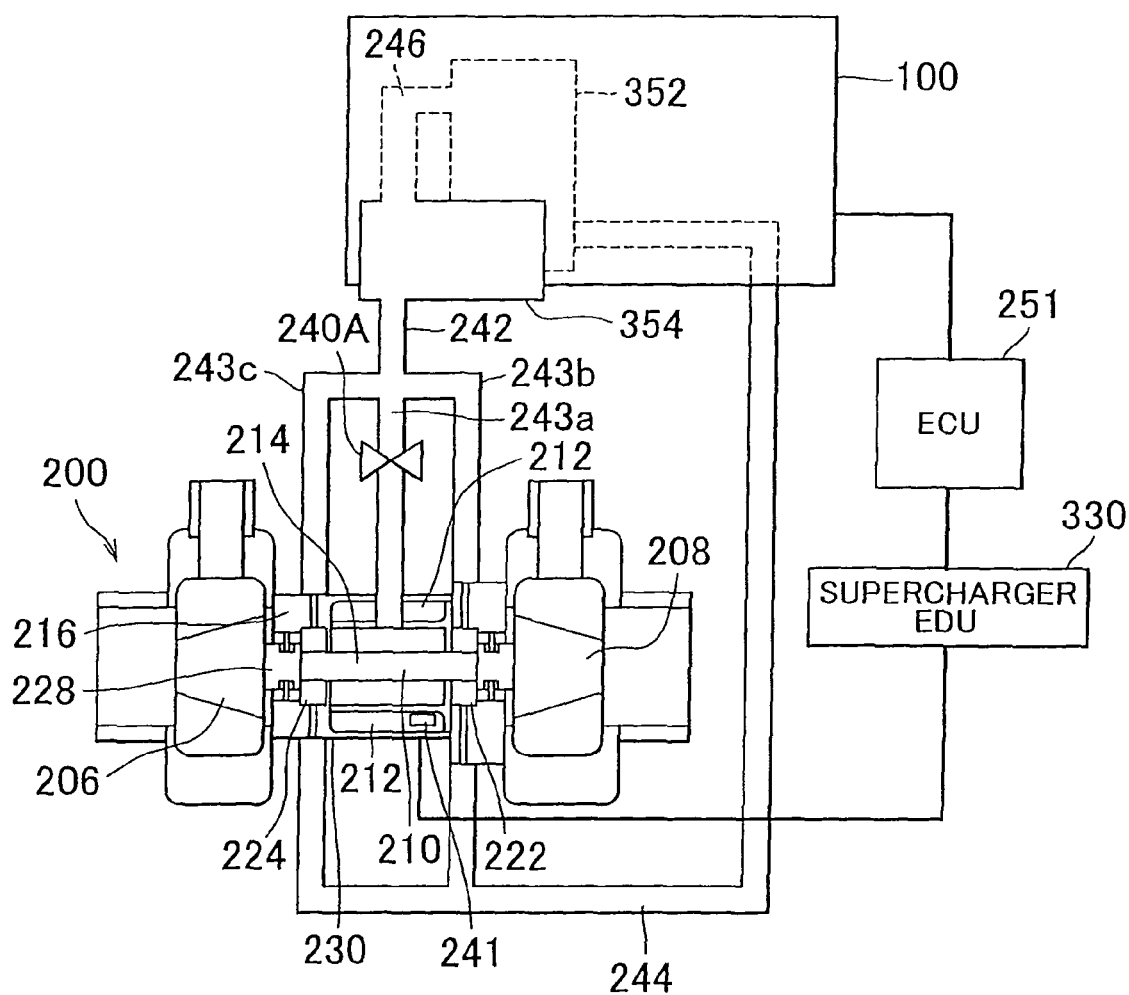
FIG. 2 is a diagram showing a schematic view of the electric supercharger according to the first example embodiment.

FIG. 2 is a diagram showing a schematic view of the electric supercharger according to the first example embodiment. Referring to FIG. 2, the electric supercharger according to the first example embodiment includes an ECU 251, the supercharger EDU 330, the supercharger 200, the assist motor 216, the oil pan 352, the oil pump 354, a lubricating oil supply passage 242, and a discharge passage 244.

The assist motor 216 includes the rotor 214 that is provided on an intermediate portion of the shaft 210 and is linked to the shaft 210, a stator 212 facing the rotor 214 from a direction orthogonal to the rotation axis of the shaft 210, and a case 230 that places the stator 212. The stator 212 is formed so as to surround the rotor 214 with respect to the rotation axis. In the first example embodiment, the assist motor 216 is an electric motor of three phases (in this embodiment, U-phase, V-phase and W-phase). The rotor 214 is provided with permanent magnets. A temperature sensor 241 (e.g., a thermistor, a thermocouple, etc.) that detects the temperature of the stator 212 is provided near the stator 212. A result of detection of the temperature sensor 241 is input to the ECU 251. The ECU 251 shown in FIG. 2 is an integrated illustration of the engine ECU 250 and the supercharger ECU 340 shown in FIG. 1. The ECU 251 controls the engine 100, the assist motor 216, and the supercharger EDU 330 (inverter).

The shaft 210 is rotatably supported on the case 230 of the assist motor 216 by a bearing portion 222 provided on the turbine wheel 208 side, a bearing portion 224 provided on the compressor wheel 206 side, and a thrust bearing 228. Furthermore, a spacer (not shown) is provided between the compressor wheel 206 and the thrust bearing 228.

The oil pump 354 is driven by rotation of the engine 100 to supply lubricating oil that has been stored in the oil pan 352 to a lubricating oil supply passage 246 leading to the engine 100, and to the lubricating oil supply passage 242 leading to the electric supercharger that includes the assist motor 216.

The lubricating oil supply passage 242 comes to be divided into three passages, which are a lubricating oil supply passage 243a leading to the rotor 214, a lubricating oil supply passage 243b leading to the bearing portion 222, and a lubricating oil supply passage 243c leading to the bearing portion 224. A mechanical pressure valve 240A is provided on an intermediate portion of the lubricating oil supply passage 243a.

Inside the case 230, the lubricating oil supply passage 243a is formed so that the lubricating oil flows in such a fashion that allows heat exchange between the lubricating oil and the rotor 214. Likewise, the lubricating oil supply passages 243b, 243c are formed inside the case 230 so as to supply lubricating oil to the bearing portions 222, 224, respectively, in such a fashion that allows heat exchange between the lubricating oil and the bearing portions 222, 224. The lubricating oil in the case 230 flows into the discharge passage 244. After flowing into the discharge passage 244, the lubricating oil returns to the oil pan 352. That is, the lubricating oil supply passages 243b, 243c may be regarded as a "first passage" in the invention, and the lubricating oil supply passage 243a may be regarded as a "second passage" in the invention.

Figure 3:
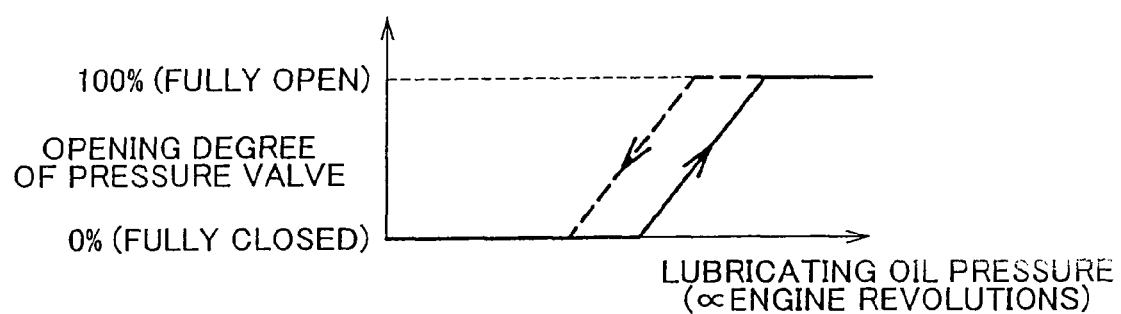
FIG. 3 is a graph illustrating the characteristics of a pressure valve shown in FIG. 2.

The mechanical pressure valve 240A opens when the lubricating oil pressure in the lubricating oil supply passage 243a is greater than or equal to a predetermined pressure, and is closed when the lubricating oil pressure in the lubricating oil supply passage 243a is less than a predetermined pressure by a mechanical device such as a spring or a torsion bar having a biasing force. As shown in FIG. 3, the mechanical pressure valve 240A may have hysteresis characteristics that an opening pressure from the closed valve state is different from a closing pressure from the open valve state. As described above, the oil pump 354, the lubricating oil supply passages 242 and 243a to 243c, and the flow rate control valve 240 (mechanical pressure valve 240A) may be regarded as a "refrigerant supply device" in the invention, which supplies the lubricating oil to the electric supercharger that includes the assist motor 216.

Because refrigerant supply device controls the amount of the lubricating oil supplied to the rotor 214 using the mechanical pressure valve 240A, the supply of lubricating oil to the rotor 214 may be reduced or shut off when the lubricating oil pressure is low, that is, when the engine rotation speed is low. On the other hand, according to the configuration in which the cooling of the rotor is controlled only on the basis of the rotor rotation speed as described in, for example, JP-A-2005-90403 and JP-A-2003-102147, the lubricating oil as a refrigerant is supplied to the rotor because the rotor rotation speed rises up to a certain degree when the engine is in a low-rotation speed with a high load.

However, the exhaust gas temperature is low when the engine is in the low-rotation speed with the high load. Furthermore, it is only in a limited operating situation (for example, only during an early period of acceleration, a hill-climbing with a high gear) that the engine is operated in the low-rotation speed with the high load. Therefore, the temperature of the rotor does not rise very high although the rotor rotation speed rises, and the rotor is in low need for cooling down.

By controlling the supply amount of the lubricating oil to the rotor using the mechanical pressure valve 240A in accordance with the lubricating oil pressure, that is, the engine rotation speed, a refrigerant supply control that stops the supply of the lubricating oil to the rotor 214 by closing the mechanical pressure valve 240A when the engine is in the low-rotation speed with the high load, may be realized. Thus, an increase in the energy consumption of the oil pump 354 may be restrained and an unnecessary increase of the rotation resistance of the rotor 214 may be prevented. As a result, the assist motor 216 in the electric supercharger may be further efficiently cooled, and deterioration of fuel economy may be prevented.

Furthermore, in the first example embodiment, the lubricating oil supply passage 242 is divided into the lubricating oil supply passage 243a toward the rotor 214 and the lubricating oil supply passages 243b, 243c toward the bearing portions 222, 224. Incidentally, the mechanical pressure valve 240A is provided only on the lubricating oil supply passage 243a. Therefore, even when the engine is in the low rotation speed with the high load, that is, the supply of lubricating oil to the rotor 214 is shut off, the lubricating oil may be supplied to the bearing portions 222, 224 via the lubricating oil supply passages 243b, 243c. As a result, although the rotor rotation speed rises when the engine is in the low rotation speed with the high load, the lubrication and cooling of the bearing portions 222, 224 may be reliably secured.

Furthermore, the combination of the oil pump 354 driven by the engine and the mechanical pressure valve 240A, as shown in FIG. 2, requires only a small number of component parts and is therefore advantageous in cost.

Figure 4:
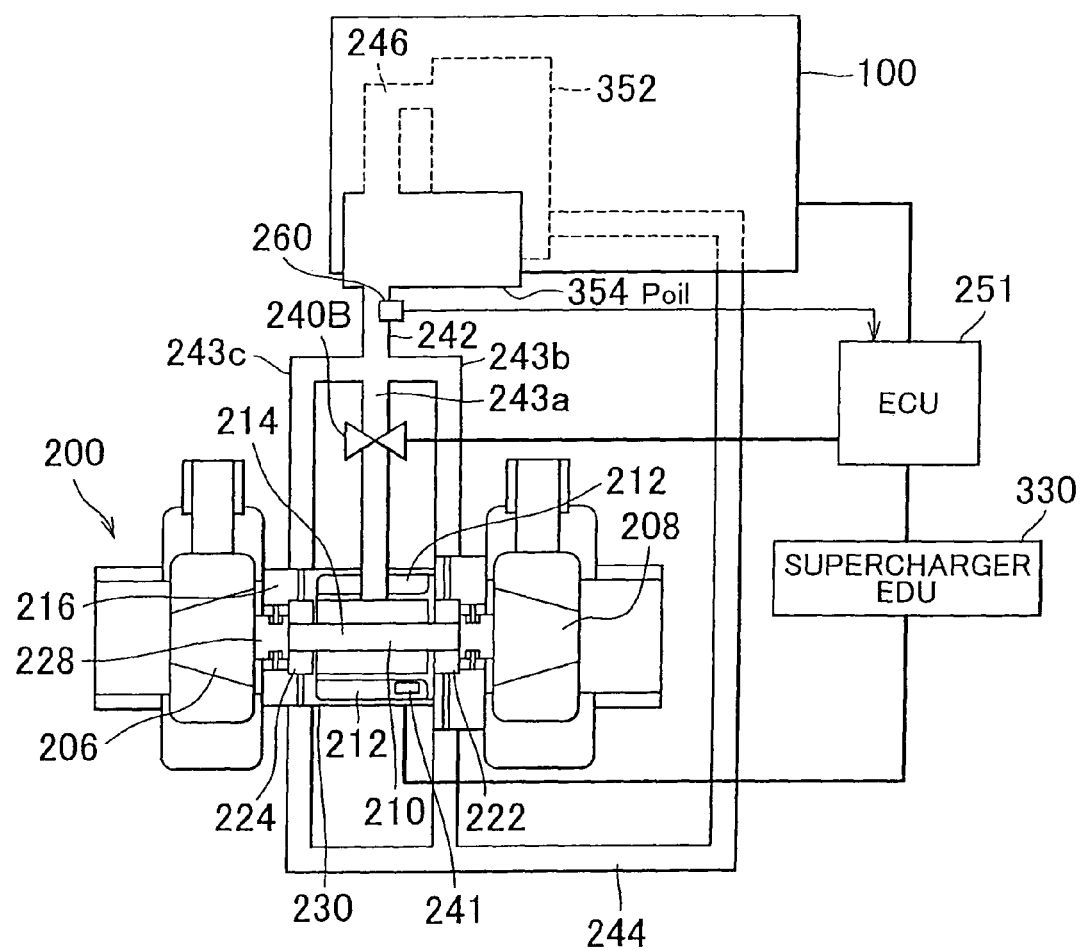
FIG. 4 is a diagram showing a schematic view of the electric supercharger according to a second example embodiment of the invention.

FIG. 4 is a diagram showing a schematic view of the electric supercharger according to a second example embodiment of the invention.

Compared with the electric supercharger shown in FIG. 2, the electric supercharger according to the second example embodiment shown in FIG. 4 is further provided with an oil pressure sensor 260 that detects the pressure of the lubricating oil supplied from the oil pump 354. The ECU 251 may acquire a lubricating oil pressure $P_{oil}$ on the basis of an output signal from the oil pressure sensor 260.

Furthermore, an electromagnetic type opening degree control valve (hereinafter, referred to as "opening degree adjustment valve") 240B as the flow rate control valve 240, which is instead of the mechanical pressure valve 240A, is provided on the lubricating oil supply passage 243a. The opening degree of the opening degree adjustment valve 240B is controlled by a control signal from the ECU 251. That is, the ECU 251 may be regarded as a "control portion" in the invention.

As mentioned above, the temperature of the rotor in the assist motor 216 is greatly affected by the temperature of the exhaust gas of the engine. Also, the temperature of the exhaust gas is determined by a combination of the engine rotation speed and the engine load. Specifically, the higher the engine rotation speed and the engine load become, the higher the temperature of the exhaust gas rises. Therefore, the rotor 214 is in high need for cooling down in the high engine rotation speed with the high engine load. On the other hand, when the engine is in a high rotation speed with a low load, the rotor 214 is in lower need for cooling down as compared to when the engine is in the high rotation speed with the high load. In the second example embodiment, the opening degree of the opening degree adjustment valve 240B is controlled in accordance with a predetermined map taking into consideration a relationship between the engine operation state and the exhaust gas temperature, as shown in FIG. 5.

Figure 5:
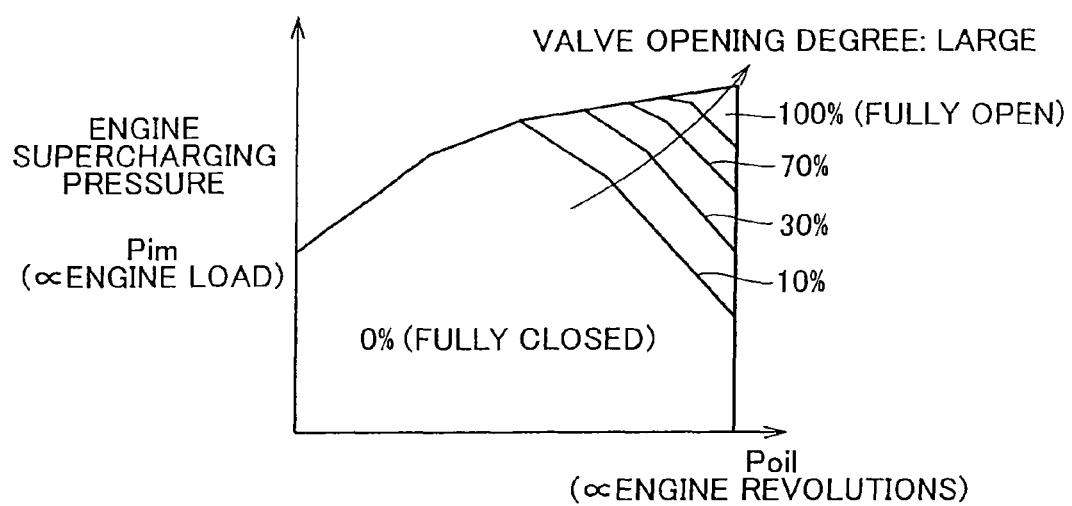
FIG. 5 is a graph illustrating a control of an electromagnetic type opening degree adjustment valve shown in FIG. 4.

Referring to FIG. 5, the lubricating oil pressure $P_{oil}$ shown by the horizontal axis is detected by the oil pressure sensor 260, and rises in accordance with increases in the engine rotation speed. The engine supercharge pressure $P_{im}$ shown by the vertical axis is detected by the intake pipe pressure sensor 170 shown in FIG. 1, and rises in accordance with increases in the engine load.

Therefore, as shown in FIG. 5, by controlling the opening degree of the opening degree adjustment valve 240B on the basis of the lubricating oil pressure $P_{oil}$ and the engine supercharge pressure $P_{im}$, the supply of refrigerant may be controlled so that the opening degree of the opening degree adjustment valve 240B is made larger to increase the amount of the lubricating oil supplied to the rotor 214 as the engine rotation speed and the engine load become higher. On the other hand, in the second example embodiment, the supply of the lubricating oil to the rotor 214 is stopped not only when the engine is in the low rotation speed but also when the engine is in a high rotation speed with a low load. Incidentally, the horizontal axis in FIG. 5 may directly represent the engine rotation speed, and the vertical axis may represent either the load factor of the engine or the intake air amount Q.

Figure 6:
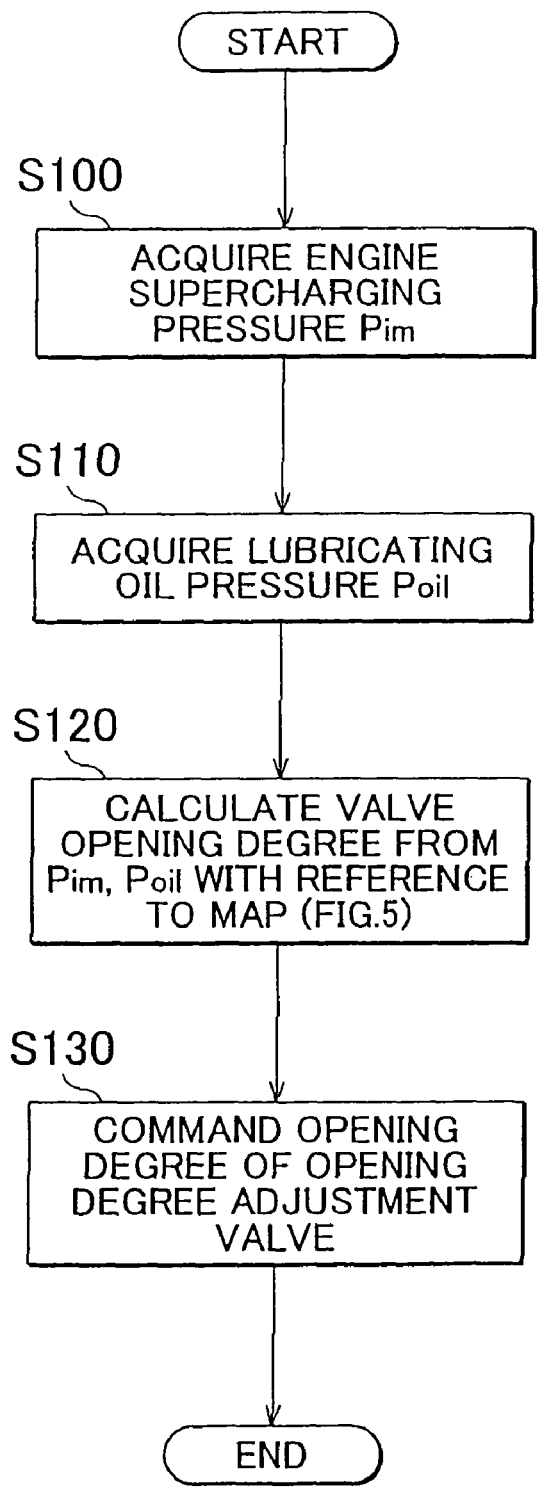
FIG. 6 is a flowchart illustrating a refrigerant supply control in the electric supercharger according to the second example embodiment.

The refrigerant supply control as described above may be realized by the ECU 251 that executes a program as illustrated by the flowchart of FIG. 6 in a predetermined cycle.

Referring to FIG. 6, the ECU 251 acquires an engine supercharge pressure $P_{im}$ on the basis of the output signal of the intake pipe pressure sensor 170 in step S100. Furthermore, the ECU 251 acquires the lubricating oil pressure $P_{oil}$ on the basis of the output signal of the oil pressure sensor 260 in step S110.

Then, in step S120, the ECU 251 calculates the opening degree of the opening degree adjustment valve 240B with reference to the map shown in FIG. 5 on the basis of the engine supercharge pressure $P_{im}$ and the lubricating oil pressure $P_{oil}$ acquired in steps S100 and S110.

Furthermore, in step S130, the ECU 251 generates an electric signal commanding the opening degree of the opening degree adjustment valve 240B that has been calculated in step S120, and sends the electric signal to the driving device (not shown) of the opening degree adjustment valve 240B. Thus, the opening degree of the opening degree adjustment valve 240B is controlled to the opening degree that has been set in the map shown in FIG. 5, on the basis of the electric signal from the ECU 251.

Therefore, the electric supercharger according to the second example embodiment may perform the refrigerant supply control that supplies the rotor 214 with an amount of the lubricating oil in accordance with cooling needs of the rotor 214, taking into account the relationship between the engine operation state and the temperature of the exhaust gas. As a result, unnecessary supply of the lubricating oil when the engine is in the high rotation speed with the low load may be also restrained, and the assist motor may be more efficiently cooled in comparison with the first example embodiment. Furthermore, unnecessary increases in the energy consumption of the oil pump 354 and the rotational resistance of the rotor 214 may be further effectively avoided, and thereby the fuel economy of the vehicle may be improved.

Still further, it does not need to provide a margin factoring in various individual differences of the valves because the opening degree adjustment valve 240B in the second example embodiment improves the valve opening degree control characteristics in comparison with the mechanical pressure valve 240A in the first example embodiment. Therefore, the unnecessary supply of the lubricating oil when the assist motor is in low need for cooling down may be restrained. Also, a cooling efficiency of the assist motor may be further raised to improve the fuel economy of the vehicle.

Incidentally, the oil pump 354 shown in FIG. 2 and FIG. 4 is not limited to a mechanical pump that is driven by rotation of the engine, but may also be, for example, an electric oil pump that is controlled in accordance with the engine rotation speed. While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An electric supercharger comprising:
    a supercharger that compresses an intake air of an internal combustion engine by rotating the supercharger using an exhaust gas of the internal combustion engine;
    a rotating electrical machine that has a rotor that is linked to a rotating shaft of the supercharger; and
    an refrigerant supply device that supplies a refrigerant to the rotating electrical machine, the refrigerant supply device including a cooling control device that controls a refrigerant supply amount which is supplied to the rotating electrical machine according to rotation speed of the internal combustion engine, the cooling control device continuously increasing the refrigerant supply amount as the rotation speed of the internal combustion engine increases, the refrigerant being a lubricating oil of the internal combustion engine.

2. The electric supercharger according to claim 1, wherein:
    the refrigerant supply device includes a refrigerant supply pump;
    a pressure of the refrigerant that is supplied from the refrigerant supply pump increases as the rotation speed of the internal combustion engine increases; and
    the cooling control device has a flow rate control valve that is provided on a refrigerant supply passage which extends from the refrigerant supply pump to the rotating electrical machine, and that controls a flow rate of the refrigerant.

3. The electric supercharger according to claim 2, wherein:
    the flow rate control valve is a pressure valve that is mechanically opened as the pressure of the refrigerant supplied from the refrigerant supply pump increases.

4. The electric supercharger according to claim 3, wherein:
    the refrigerant supply passage is divided into a first passage that is formed so as to allow heat exchange between a bearing portion of the rotating shaft of the supercharger and the refrigerant, and a second passage that is formed so as to allow heat exchange between the rotor of the rotating electrical machine and the refrigerant; and
    the pressure valve is provided on the second passage.

5. The electric supercharger according to claim 4, wherein:
    the pressure valve is opened when the pressure of the refrigerant in the second passage is greater than or equal to a predetermined pressure.

6. The electric supercharger according to claim 5, wherein:
    the predetermined pressure is a pressure when the pressure valve starts to open from a closed valve state; and
    the predetermined pressure is different from a pressure when the pressure valve starts to be closed from an open valve state.

7. The electric supercharger according to claim 1, wherein:
    the cooling control device continuously increases the refrigerant supply amount which is supplied to the rotating electrical machine as the rotation speed and a load of the internal combustion engine increase.

8. The electric supercharger according to claim 7, wherein:
    the refrigerant supply device includes a refrigerant supply pump;
    a pressure of the refrigerant that is supplied from the refrigerant supply pump increases as the rotation speed of the internal combustion engine increases; and
    the cooling control device includes i) a flow rate control valve that is provided on a refrigerant supply passage which extends from the refrigerant supply pump to the rotating electrical machine, and that controls a flow rate of the refrigerant and ii) a control portion that controls opening degree of the flow rate control valve.

9. The electric supercharger according to claim 8, wherein:
    the flow rate control valve is an opening degree adjustment valve whose opening degree is electromagnetically adjusted by the control portion; and
    the control portion adjusts the opening degree of the opening degree adjustment valve in accordance with the rotation speed and the load of the internal combustion engine.

10. The electric supercharger according to claim 9, wherein:
    the control portion adjusts the opening degree of the opening degree adjustment valve by calculating an opening degree value of the opening degree adjustment valve based on the rotation speed and the load of the internal combustion engine.

11. The electric supercharger according to claim 9, wherein:
    the refrigerant supply passage is divided into i) a first passage that is formed so as to allow heat exchange between a bearing portion of the rotating shaft of the supercharger and the refrigerant, and ii) a second passage that is formed so as to allow heat exchange between the rotor of the rotating electrical machine and the refrigerant; and the opening degree adjustment valve is provided on the second passage.

12. The electric supercharger according to claim 2, wherein:
the refrigerant supply pump is an oil pump that is driven by a rotating shaft of the internal combustion engine to output the lubricating oil.

13. The electric supercharger according to claim 8, wherein:
the refrigerant supply pump is an oil pump that is driven by a rotating shaft of the internal combustion engine to output the lubricating oil.

14. An electric supercharger comprising:
a supercharger that compresses an intake air of an internal combustion engine by rotating the supercharger using an exhaust gas of the internal combustion engine;
a rotating electrical machine that has a rotor that is linked to a rotating shaft of the supercharger; and
an refrigerant supply device that supplies a refrigerant to the rotating electrical machine, the refrigerant supply device including a cooling control device that controls a refrigerant supply amount which is supplied to the rotating electrical machine according to rotation speed of the internal combustion engine, the cooling control device increasing the refrigerant supply amount as the rotation speed of the internal combustion engine increases, the refrigerant being a lubricating oil of the internal combustion engine;
wherein:
the refrigerant supply device includes a refrigerant supply pump;
a pressure of the refrigerant that is supplied from the refrigerant supply pump increases as the rotation speed of the internal combustion engine increases; and
the cooling control device has a flow rate control valve that is provided on a refrigerant supply passage which extends from the refrigerant supply pump to the rotating electrical machine, and that controls a flow rate of the refrigerant.

* * * * *